(No Model.)
C. RIEOHEN.
POTATO DIGGER.
No. 391,078. Patented Oct. 16, 1888.
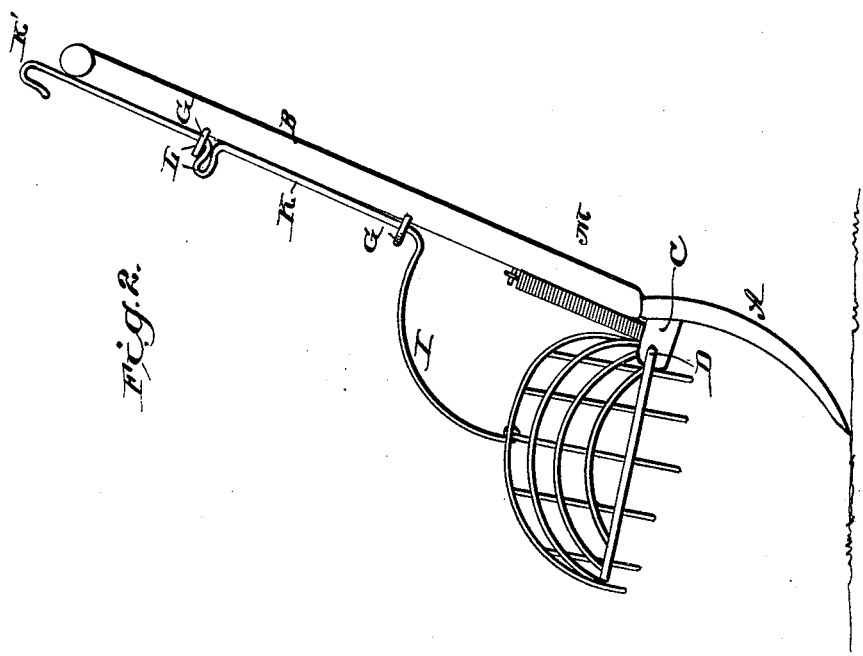
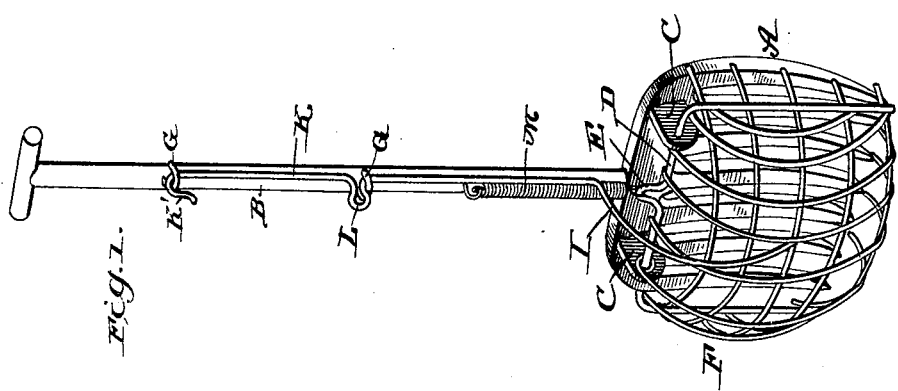
Witnesses,
Jos. A. Ryan
C. E. Doyle
Inventor,
Charles Rieohen.
By his Attorneys
C. A. Snowden
N. PETERS, Photo-Lithographer, Washington, D. C.

UNITED STATES PATENT OFFICE.

CHARLES RIEOHEN, OF CHICAGO, ILLINOIS.

POTATO-DIGGER.

SPECIFICATION forming part of Letters Patent No. 391,078, dated October 16, 1888.

Application filed April 26, 1888. Serial No. 271,936. (No model.)

*To all whom it may concern:*

Be it known that I, CHARLES RIEOHEN, a citizen of the United States, residing at Chicago, in the county of Cook and State of Illinois, have invented a new and useful Improvement in Potato-Diggers, of which the following is a specification.

My invention relates to a potato-digger; and it has for its object to provide means whereby when a hill of potatoes is lifted the earth may be shaken from the potatoes before the latter are thrown from the fork or spade. I attain this object by mounting a basket on the fork or spade in such a way that when the hill is raised the basket is closed down, and then the earth is shaken through the meshes of the basket, leaving the potatoes therein.

The invention consists in a certain novel construction and combination of devices fully set forth hereinafter in connection with the accompanying drawings, wherein—

Figure 1 is a perspective view of the improved potato-digger in the operative or closed position. Fig. 2 is a side view showing the basket in its raised or open position.

Referring to the drawings, A designates the digging fork or spade having the handle B, and C C designate apertured ears on the front side of the fork or spade at its upper edge. In the said apertures is mounted the crank-shaft D, having the crank or loop E at its center. The basket F is attached to this shaft, and it consists of interlaced wires forming a screen.

In keepers G G on the handle is mounted the operating-rod K, having a curved arm, I, at its lower end, which is attached to the center of the basket. A hook or handle, K', is formed on the upper end of the operating-rod, and a loop or stop, L, is formed at an intermediate point of the rod to strike the keepers G G, respectively, at opposite ends of the movement of the rod. When the operating-rod is drawn upward, the basket is raised or drawn back, and when the said rod is moved downward the basket is closed. These two positions are shown, respectively, in Figs. 2 and 1 of the drawings.

A coiled spring, M, is attached at one end to the lower end of the crank or loop E and at the other end to the handle of the fork or spade, and therefore it will be seen that the lower end of the crank is drawn upward, and the basket is consequently closed down upon the fork or spade.

The operation of the digger is as follows: Raise the basket, force the fork or spade into the earth close to a potato-hill, and after raising the potatoes and the earth allow the basket to close. Shake the digger until all the earth has been removed from the potatoes and has passed through the meshes of the basket, when the latter may be raised and the potatoes deposited in a suitable receptacle.

This device may be applied to any shovel, fork, or spade, and by its use potatoes may be dug and placed in a basket without handling them.

The spring may be omitted on this device; but I prefer to use it as described, for the reason that it obviates the necessity of holding the basket in a closed position while shaking the earth from the potatoes.

The loop or stop L also serves to enable the hand which grasps the handle of the fork or spade to more easily hold the rod while the basket is in its open position.

Having thus described my invention, I claim—

1. In a potato-digger, the combination, with a fork or spade, of a basket, F, mounted thereon and provided with an operating handle or rod, the said basket being formed of interlaced wires forming a screen, whereby the potatoes may be held on the fork or spade while the earth is detached therefrom and shaken through the meshes of the screen, substantially as specified.

2. In a potato-digger, the combination, with a fork or spade provided with apertured ears C C, of the crank-shaft mounted in the apertures of the said ears, the basket F, secured to the said shaft and composed of interlaced wires, the operating-rod K, attached to the basket, and the contractile spring M, connected to the crank E of the said shaft and adapted to normally hold the basket closed, substantially as specified.

3. In a potato-digger, the combination, with a fork or spade, of the crank-shaft D, mounted thereon and provided with a loop or crank, E, the basket F, attached to the shaft and formed of interlaced wires, the contractile spring M, connected to the loop or crank E, and the operating-rod K, mounted in keepers G G on the handle of the fork or spade and provided with a curved arm, I, connected to the basket, and also provided with a loop or stop, L, adapted to limit the movement of the basket by striking the keepers G G, substantially as and for the purpose specified.

In testimony that I claim the foregoing as my own I have hereto affixed my signature in presence of two witnesses.

CHARLES RIEOHEN.

Witnesses:
  A. KNOP,
  PATRICK KEEGAN.